United States Patent [19]

Dorsey et al.

[11] Patent Number: 4,971,418

[45] Date of Patent: Nov. 20, 1990

[54] APPARATUS AND METHOD FOR MAKING LOW-LOSS PERMANENT OPTICAL FIBER SPLICES

[75] Inventors: Carl S. Dorsey, Bethlehem, Pa.; Paul C. Michaelis, Watchung, N.J.

[73] Assignee: AT&T Bell Laboratories, Murray Hill, N.J.

[21] Appl. No.: 401,215

[22] Filed: Aug. 31, 1989

[51] Int. Cl.$^5$ .............................................. G02B 6/38
[52] U.S. Cl. ................................................. 350/96.21
[58] Field of Search ........................... 350/96.20, 96.21

[56] References Cited

U.S. PATENT DOCUMENTS

| | | | |
|---|---|---|---|
| 4,585,304 | 4/1986 | Winter et al. | 350/96.21 |
| 4,729,625 | 3/1988 | Loscoe et al. | 350/96.21 |
| 4,735,481 | 4/1988 | Lukas et al. | 350/96.21 |
| 4,840,450 | 6/1989 | Jones et al. | 350/96.21 |
| 4,854,667 | 8/1989 | Ebata et al. | 350/96.21 |

Primary Examiner—William L. Sikes
Assistant Examiner—Robert E. Wise
Attorney, Agent, or Firm—Charles E. Graves

[57] ABSTRACT

A single laser is used as a heat source to activate droplets of acid applied to two optical fibers for selective stripping of fiber coating, for forming conical sections on the coating adjacent the exposed fiber for improved bonding, and for fusing the fibers together in a splice. An enhanced method for aligning the two fiber ends prior to splicing is also disclosed, consisting of a TV camera scanning of selected cross-sections of both fibers following stripping and cleaving, to devleop indicia of the relative location of the fiber cores. Lateral adjustment of a movable chuck responsive to the indicia, brings the prepared fiber ends into precise axial alignment. The method uses a minimum of acid, ad constructs low-loss permanent fusion splices without flame or need for skilled operators.

12 Claims, 5 Drawing Sheets

APPARATUS AND METHOD FOR MAKING LOW-LOSS PERMANENT OPTICAL FIBER SPLICES

FIELD OF THE INVENTION

This invention relates to optical fiber splicing techniques; and particularly to the efficient and reliable realization of permanent splices of a high-strength, low transmission loss character.

BACKGROUND OF THE INVENTION

Most optical fiber splices intended for use in an operating environment, should be both strong and of low loss. The latter is a particularly important requirement for many systems where any unnecessary signal strength losses cannot be tolerated.

Achieving such fiber splices using technicians who are not required to be skilled or continuously trained, is problematic with existing methodologies, however. In addition, if the working space is confined or unstable as on-board ship, current techniques are not optimal.

Many current optical fiber splicing processes utilize a flame as the heat source for melting and fusing of two fiber ends. The flames, however, create thrust against the fibers, which must be considered or countered in order to maintain the fibers in their proper pre-splice axial alignment. Additionally, flame heat creates a differential heating of the fiber ends, resulting in a temperature gradient across the fiber cross-section. The gradient can deflect the fiber interior, which risks a weak and lossy bond at the transmitting core. Moreover, flame sources are inherently risky, particularly in confined spaces.

Laser heat sources have been employed in the prior art to avoid the noted problems which attend use of open flame fusion of optical fibers. In particular, low loss splices have been achieved in silica fibers using a pulsed $CO_2$ laser in conjunction with fiber-gripping vacuum chucks, one being stationary and the other being manipulable in three dimensions. When the fiber ends are in axial alignment and tightly abutting relation, the laser is applied to effect the fusion.

Conventional high-strength fiber splicing also frequently requires that heated sulfuric acid be employed to strip the fiber coating prior to splicing. Conventional acid application methods, both horizontal and vertical, require large volumes of heated acid, typically 50 to 100 milliliters. The acid volume poses additional safety and health hazards to splicers. In addition, the conventional acid containment vessel requires a relatively long length of free fiber, ranging from 1 to 24 inches, which is cumbersome to use.

OBJECTS OF THE INVENTION

One object of the invention is to achieve permanent optical fiber splices of consistent high strength and low loss, under adverse field conditions.

A further object of the invention is to develop a fiber splicing process which is both technically sound and also safer for users.

A further object of the invention is to provide a fiber splicing methodology which yields consistently satisfactory results with relatively unskilled labor.

SUMMARY OF THE INVENTION

The present invention makes novel and advantageous use of a laser heat source in conjunction with a greatly reduced volume of acid, to strip, shape and, thereafter, fusion-splice two optical fibers.

The present invention further combines the use of laser energy with an enhanced method for aligning the two fiber ends prior to splicing. The alignment technique entails TV camera scanning of selected cross-sections of both fibers following stripping and cleaving, to develop indicia of the relative location of the fiber cores. Lateral adjustment of the movable chuck by increments proportional to the difference in the location indicia thus generated for the two fiber cores, then brings the prepared ends into precise axial alignment.

The splice is effected with the fiber ends in tight abutting relation, with a "pre-load" applied to the fibers. Specifically, one fiber end is displaced in what is tantamount to an overlapping relation with respect to the second fiber end. The pre-load is helpful to the reliable achievement of low loss, high strength splices.

In a specific application of the invention, the described process is adapted to creating optical fiber splices with predetermined loss characteristics. A particular loss level is occasionally desired rather than a relatively loss-free splice for certain applications; and to achieve it, the present preventive process adapted.

The invention, its further objects, features, and advantages, are set forth in the description to follow of an illustrative embodiment thereof.

DETAILED DESCRIPTION OF AN ILLUSTRATIVE EMBODIMENT

Figure 1:
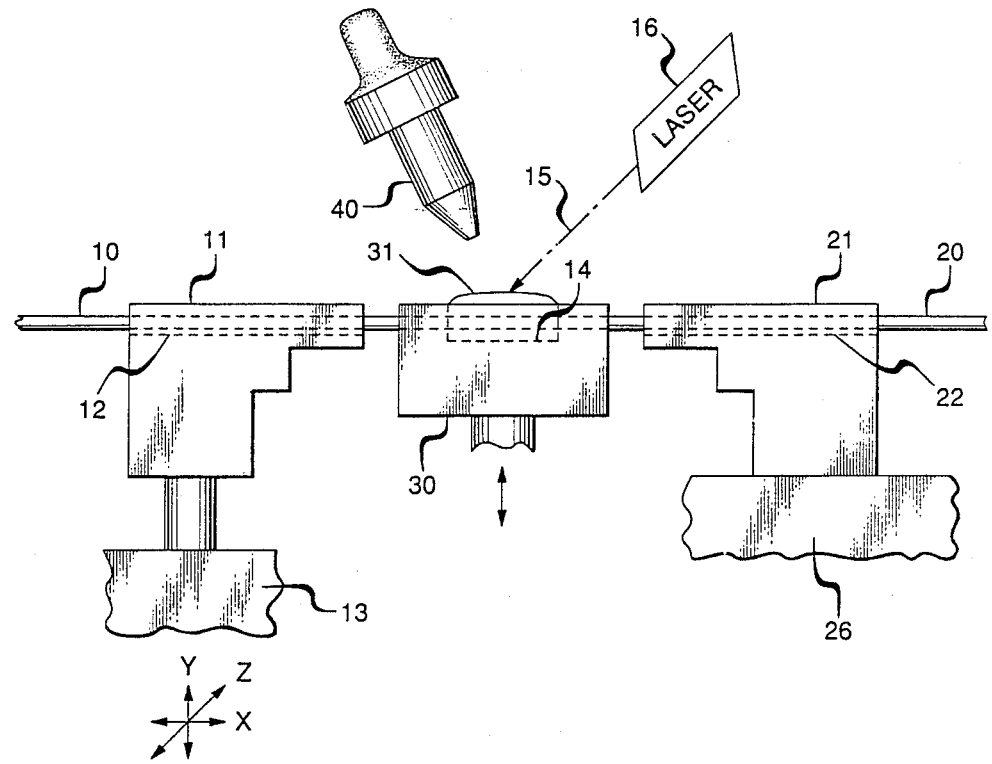
FIG. 1 is a schematic diagram of apparatus for practicing the process steps of aligning the fibers and applying the acid.
Figure 4:
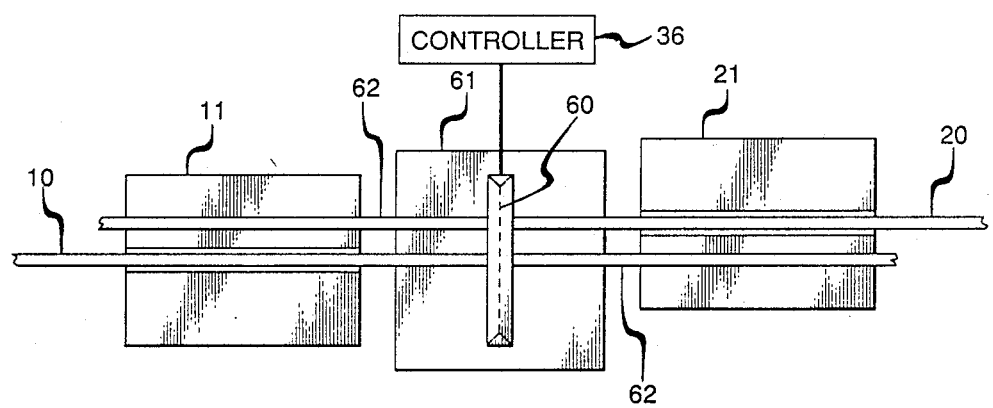
FIG. 4 is a schematic diagram of apparatus for practicing the step of cleaving.

As shown in FIG. 1, two optical fibers to be spliced, denoted 10, 20 are respectively placed in V-grooves 12, 22 of movable chuck 11 and fixed chuck 21. The chucks are initially positioned as seen in FIG. 4, with the fiber-receiving V-grooves 12, 22 laterally offset so that the core axes of the two fibers are not in alignment.

An acid application station 30 is brought into position with respect to the fibers 10, 20, as seen in FIG. 1. Station 30 includes a reservoir 14, provided on a dovetail slide which is centered between the chucks. The acid reservoir 14 is of greatly reduced capacity, having as its main purpose the containment of any slight residue from the application of acid droplets. A minimal amount of an acid, such as sulfuric acid, is then applied via an applicator such as dropper 40 to the cleave zone of the two fibers 10, 20. The applied acid is denoted 31, and can be as little as two or three droplets instead of the milliliter quantities used in the acid baths of the prior art. A lens 17, with a 30 cm focal length, is mounted on a 3-axis micropositioner 32 and placed between the laser and vacuum chucks. Lens 17 is adapted to broaden the beam 15 or to focus the beam thereby to concentrate the laser energy. With the acid applied, a laser beam 15 from a source 16, is directed onto the acid droplets to commence the stripping of the optical fiber coating 27 in the vicinity of the splice area. The $CO_2$ laser advantageously has an operating wavelength of 10.6 microns. From a 10- watt lasers, up to 6 watts of power is available for stripping.

The position viewing system consisting of TV cameras 82, 83 is utilized for inspection of the stripping stage. A binocular microscope (not shown) may alternatively be included in the process for monitoring and inspection.

The power density is increased when the beam is focussed to the dimensions of the fiber's diameter. The beam 15 is diffused or widened by beam focusing mechanism 17, to de-concentrate the optical energy while retaining its ability to generate substantial heat in objects. At this stage, the beam 15 is diffused and utilized to heat the acid droplets 31 to about 200 degrees Centigrade, a temperature at which the acidic activity is substantially increased. The laser beam is moved along the axis of the fiber by moving the lens 17 in a direction parallel to the fiber axis. As beam 15 heats the acid it also is directed onto the strip zone to differentially activate the acid in order to selectively strip the coating. The duration and sweep of beam 15, to effect this step, may be varied to suit the need of the particular splice.

Figure 2:
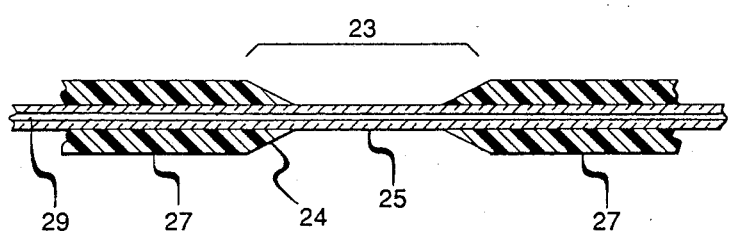
FIG. 2 is a partial sectional side view of a fiber stripped of its coating with the instant invention.
Figure 3:
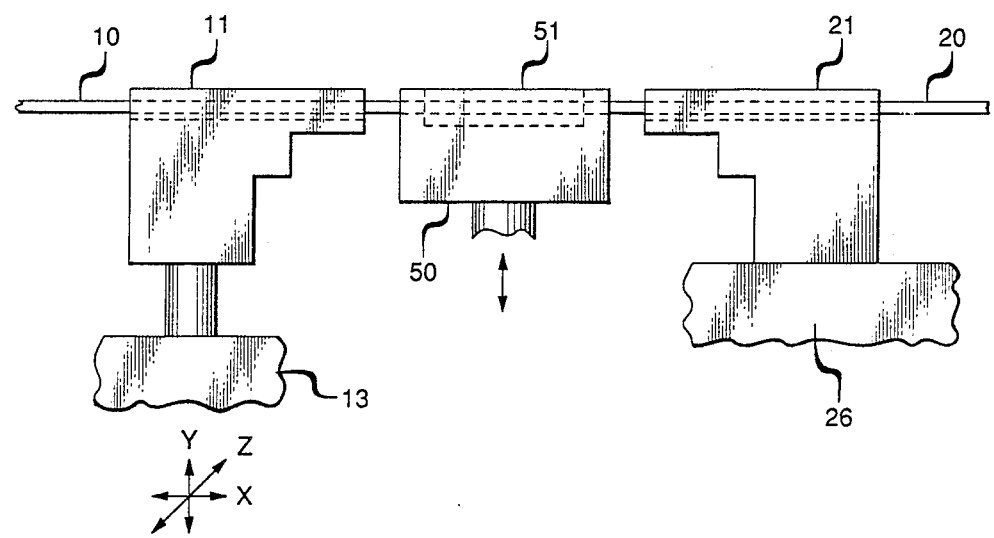
FIG. 3 is a schematic diagram of apparatus for practicing the step of rinsing.

The selective strip is monitored by the TV camera positional viewing system. The strip results in a set of conically shaped sections of fiber coating, as denoted by numeral 23 in FIG. 2. Tapered ends aid the flow and adhesion of recoat material when recoating is required.

The beam is then blocked with an absorbing brick (not shown). Then, the reservoir 14 is lowered, removing from the work station any slight acid residue that has not clung to the fibers. The fiber stripping steps described require less than 1 inch of exposed fiber and 50 microliters of sulfuric acid. The sulfuric acid which has been found suitable for use in the inventive process, has a 62 percent absorption at 10.6 microns.

At this point, the zone 23 is rinsed with methyl alcohol using a conventional bath station 50. Following the rinse, a cleaving chuck 61 is positioned as shown in FIG. 4, and the fibers 10, 20 are conventionally cleaved by a head 60. The two severed ends 63 of the cleaved fibers then are inspected by, for example, interferometric analysis, to ensure that the cleave is within the required specification, usually 1 degree of the normal.

Figure 5:
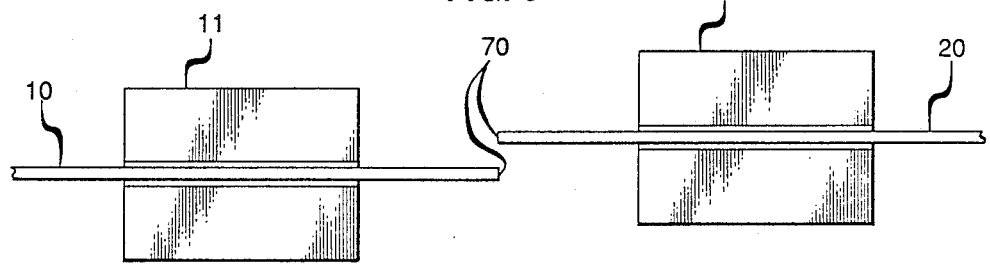
FIG. 5 is a schematic diagram of the splice station chucks following the cleave step.

From their position depicted in FIG. 5 following proper cleaving, the fibers 10, 20 are positioned into rough axial alignment, in which the fiber axes 28 of the core 29 are substantially, but not necessarily fully, coincident. In order, however, for the splice to be as loss-free as possible, it is essential that the two axes 28 be fully coincident.

Figure 6:
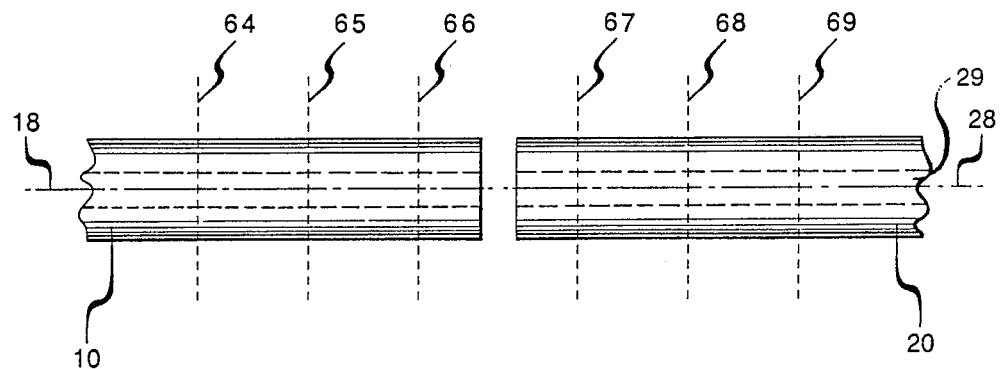
FIG. 6 is a schematic diagram of positional scanning of the fibers by a TV camera.

According to another aspect of the invention, therefore, as depicted in FIG. 6, the fiber ends 70 are moved to within close proximity of each other, and a TV line scan of the two fiber cores 29 is conducted. Several, for example, three, specific lines of a conventional TV raster are scanned across each fiber, the lines being denoted 64, 65, 66, 67, 68, 69 in FIG. 6. Using TV camera 82, seen in FIG. 8, the selected lines are scanned, with each line being separated from the adjacent lines by a distance of about 0.01 inches. The position of the brightest region along each of the scanned lines 64–69, with respect to a selected reference plane, is stored in conventional fashion in processor-monitor 81. The several positional readings are then resolved using any of a variety of resolution techniques into a single best fiber position estimate in the X–Z plane for each fiber core 29; and the two readings compared. The difference, if any, is reduced to zero by movement of the chuck 13. Alignment in the X–Y plane may be achieved by similar steps using the TV camera 83.

Figure 7:
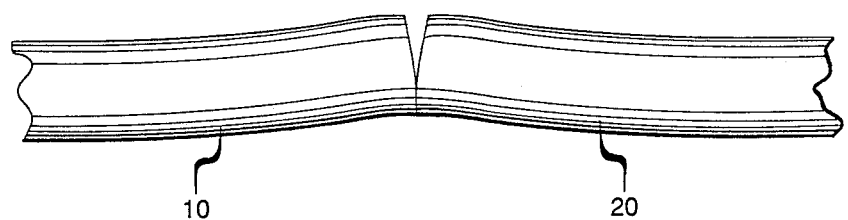
FIG. 7 is a schematic side view of two fibers cleaved and abutted, ready for a fusion splicing.

Next, the movable chuck 13 is moved toward the stationary chuck 26, to bring the fibers 10, 20 first into abutting relation and then to pre-load the fibers in the manner depicted in FIG. 7. Relatively little force, for example, approximately 0.05 pounds upon fibers of 0.005 inches outside diameter, is required to effect the needed preload. The purpose to assure that sufficient glass volume is present in the fusion zone for effecting a full diameter splice.

Figure 8:
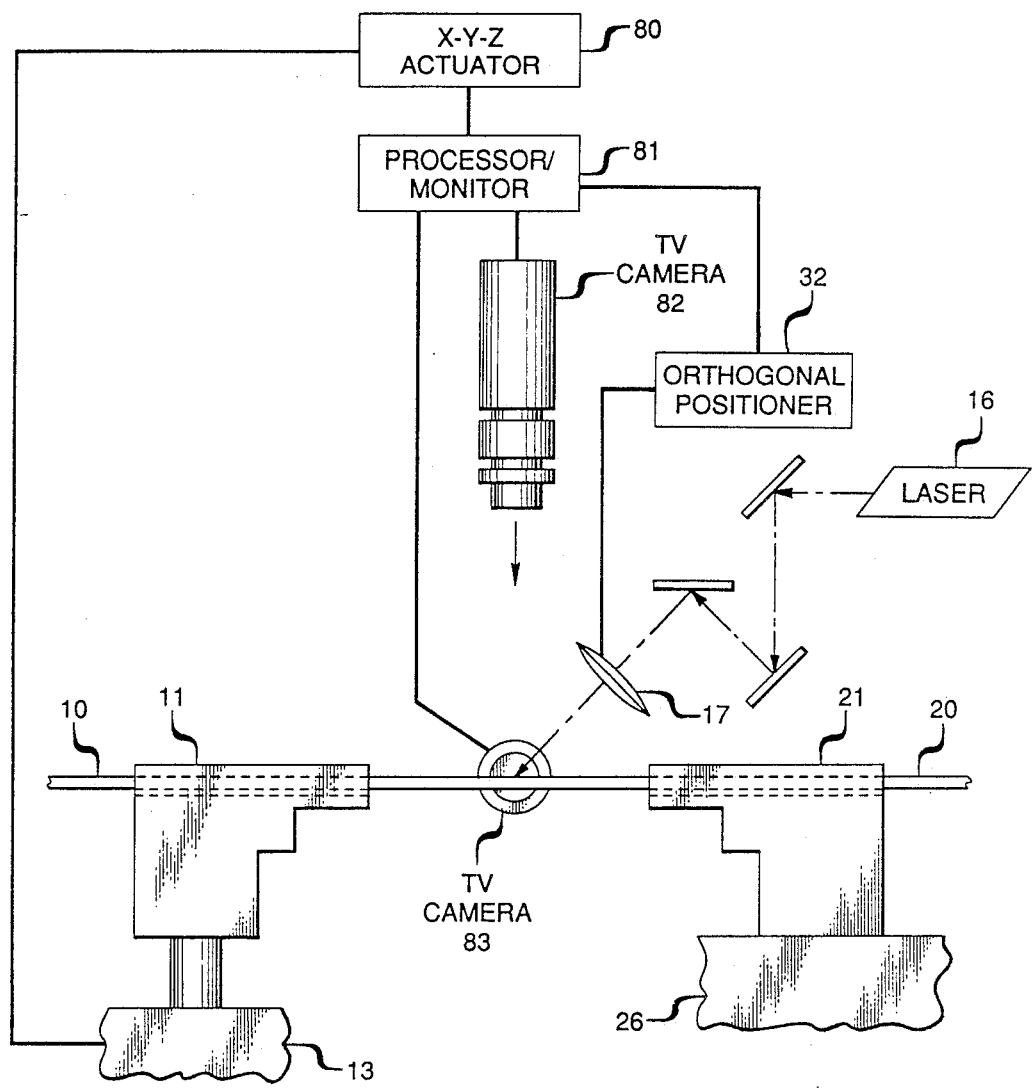
FIG. 8 is a schematic diagram of the apparatus for effecting the fusion splicing and for monitoring the results.
Figure 10:
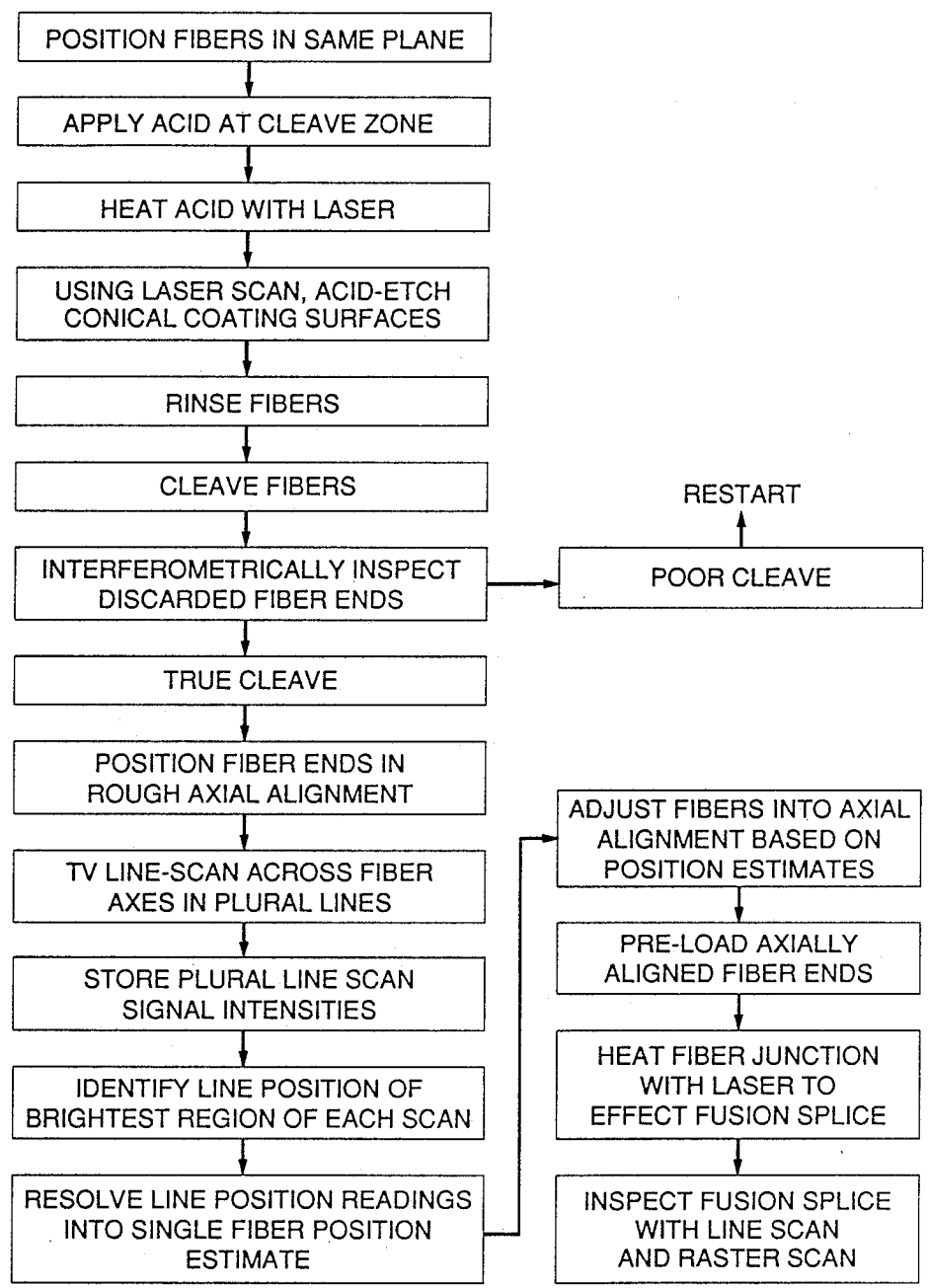
FIG. 10 is a process diagram for the present invention.

Next, as depicted in FIG. 8, the lens 17 of the laser 16 is adjusted to concentrate the beam energy in preparation for effecting a fusion splice. The effective beam width at the point of the fiber splice is monitored visually using the TV cameras 82 and a monitor, not shown. The fusion splice finally may be inspected either visually using the aforementioned monitor system comprising cameras 82, 83; or by direct optical measurement of transmission loss through the splice, if such is feasible.

The invention may be extended to optical transmission applications requiring not the low loss result as was just described, but rather requiring creation of a predetermined and controlled loss. The application may be illustrated by reference to an undersea optical receiver example. Certain optical receivers have fixed allowable input signal amplitudes. They consequently have to be fitted with input signal attenuators if the source-to-receiver cable separation decreases to the point where input signal saturation of the receiver occurs.

The described laser splice method and apparatus can be utilized to create intentionally lossy splices, by introducing an undoped glass segment between the fibers 10, 20. The segment, pictured in FIG. 9 and denoted 33, is a fiber length without a core. Segment 33 is similar to the fibers 10, 20, in that its refractive index is matched to the cladding index of the fibers 10, 20; and that its outside diameter is the same as the fibers 10, 20. Two fusion splices, 34, 35, are constructed as taught by the present inventive method and apparatus, thereby to place the segment 33 in the transmission path of the fibers 10, 20.

Figure 9:
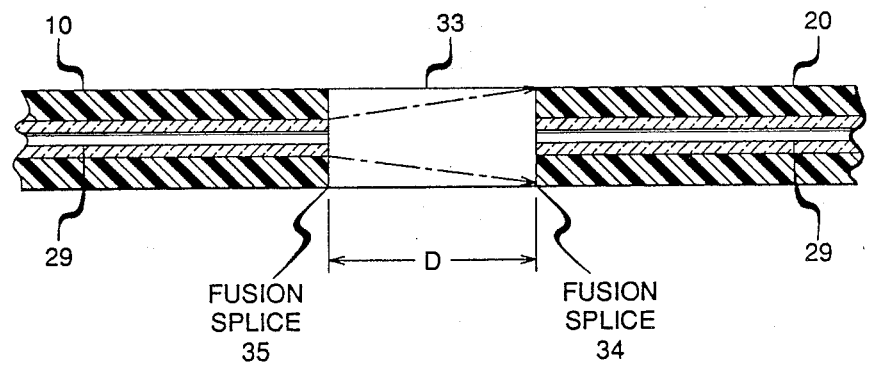
FIG. 9 is a side view of two fibers joined with fusion splices to a transition element.

The optical signal leaves the core 29 of fiber 10, and diverges as it traverses the segment 33, as illustrated in FIG. 9, by an amount determined by the length of the segment. Only a fraction of the energy of the signal being received by the fiber 20, depending on the dimension "D" shown in FIG. 9.

It is desirable to provide a position control for the cleaving head 60, schematically shown in FIG. 4 as control 36. By cleaving the two fibers at two positions separated by approximately the distance "D", room is provided for the segment 33 to interpositioned using, for example, conventional means such as manipulators (not shown).

Another method for creating a controlled loss splice, especially for the lower ranges of attenuator values (<5dB) is to introduce a core diffusion zone within the fiber, such as fiber 10, by using the present invention to internally heat the fiber core without significantly disturbing the cladding. Heating the core 29 to approximately 800 degrees centigrade for from 1 to 5 seconds with the laser 16, will create an internal lens discontinuity into the core 29, and force cladding mode propagation to occur in the cladding 37, thus dissipating power.

We claim:

1. A method for splicing a pair of cladded core, coated optical fibers, comprising the steps of:
    applying plural droplets of acid to a section of the exterior coating of each said fiber;
    heating said droplets with a laser beam;
    stripping said coating from said section by action of said laser beam and said acid;
    cleaving said fibers at said section;
    positioning the ends of said cleaved fibers in abutting relation; and
    fusing said fiber ends with said laser beam.

2. A method for splicing a pair of cladded core, coated optical fibers, comprising the steps of:
    positioning said fiber pair in planar and parallel relation;
    applying droplets of acid to a section of the exterior coating of each said fiber;
    heating said droplets with a laser having a beam of broadened width;
    selectively directing said laser beam on said droplets to create heightened acidic action for stripping of said coating, thereby to expose a section of cladding glass of each said fiber;
    cleaving said fibers;
    positioning the ends of said cleaved fibers in abutting and pre-loaded relation; and
    with said laser beam energy focused on the splice zone, fusing said fiber ends to optically splice said fiber pair.

3. A method for splicing a pair of cladded core, coated optical fibers, comprising the steps of:
    applying plural droplets of acid to a section of the exterior coating of each said fiber, while said fibers are independently positioned in planar and parallel relation;
    heating said droplets with a laser having a beam of broadened width;
    selectively directing said laser beam on said droplets to create heightened acidic action for stripping of said coating, thereby to expose a section of cladding glass of each said fiber and to taper the fiber coating adjacent each said exposed glass section;
    cleaving said fibers;
    positioning the ends of said cleaved fibers in abutting and pre-loaded relation; and
    with said laser beam energy focused on the splice zone, fusing said fiber ends to optically splice said fiber pair.

4. The method of claims 1, 2, or 3, wherein the operating wavelength of said laser is selected to coincide with the acid concentration where the absorption of said acid is substantially at its maximum.

5. The method of claims 1, 2, or 3, wherein said laser is a CO2 laser having an operating wavelength of 10.6 microns.

6. The method of claim 5, wherein said acid comprises sulfuric acid having substantially 62% absorption at 10.6 microns.

7. The method of claim 1, 2, or 3, wherein said process further comprises:
    line-scanning with a TV camera at selected vertical planes across each said fiber core;
    recording the brightest region along each of the scanned lines;
    resolving the position of each said brightest region for each said fiber into a single estimate of that fiber's position in a horizontal plane; and
    moving said fibers in said horizontal plane so that their respective cores are in axial alignment.

8. Apparatus for splicing a pair of cladded core, coated optical fibers, comprising:
    means for independently positioning said fibers in planar and parallel relation;
    means for applying droplets of acid to a section of the exterior coating of each said fiber;
    a laser;
    means for directing the beam of said laser onto said droplets;
    means for varying the energy concentration of the beam of said laser, thereby to heat said droplets, to strip said coating from said section, and to create conical sections of fiber coating by action of said laser beam and said acid;
    means for cleaving said fibers at said section;
    means for positioning the ends of said cleaved fibers in abutting relation; and
    means including said laser with its said beam focused and concentrated into said abutting fiber ends, for fusing said fiber ends.

9. Apparatus pursuant to claim 8, wherein said positioning means comprises;
    a movable chuck and a fixed chuck, each said chuck having a V-groove for receiving one of said fibers; and
    means for laterally offsetting said movable chuck relative to said fixed chuck, thereby to laterally offset the core axes of the two said fibers.

10. Apparatus pursuant to claim 9, wherein:
    said laser is a CO2 laser having an operating wavelength of 10.6 microns; and
    said acid comprises sulfuric acid having substantially a 62% absorption at 10.6 microns.

11. Apparatus pursuant to claim 10, wherein:
    said varying means comprises a lens having substantially a 30 cm. focal length; and said apparatus further comprises:
    means including a 3-axis micropositioner for mounting said lens; and
    means responsive to indicia of the position of said fibers relative to said beam, for effecting a fusion splice of said fibers 12. Apparatus in accordance with claim 11, further comprising:
    means for line-scanning in a plurality of planes normal to each of said fibers;
    means for determining the position of the brightest region along each of the scanned lines,
    means for resolving said positional readings into a single fiber position estimate in the plane of said V-grooves; and
    mans including said movable chuck for moving said fibers in said V-groove plane so that their respective cores are in axial alignment.

* * * * *

UNITED STATES PATENT AND TRADEMARK OFFICE
CERTIFICATE OF CORRECTION

PATENT NO. : 4,971,418
DATED : November 20, 1990
INVENTOR(S) : Carl S. Dorsey, et al.

It is certified that error appears in the above—identified patent and that said Letters Patent is hereby corrected as shown below:

Column 3, Line 6 - the words "A lens 17" should be the start of a new paragraph;

Column 3, Line 15 - change "From a 10- watt lasers" to --From a 10-watt laser--.

Column 6, Line 4 - change "claim 1, 2, or 3" to --claims 1, 2, or 3--;

Column 6, Line 36 - change "comprises;" to --comprises:--;

Column 6, Line 55 - change "fibers" to --fibers.--;

Column 6, Line 61 - change "lines," to --lines;--;

Column 6, Lines 65 - change "mans" to --means--.

UNITED STATES PATENT AND TRADEMARK OFFICE
CERTIFICATE OF CORRECTION

PATENT NO.    : 4,971,418

DATED         : November 20, 1990

INVENTOR(S)   : Carl S. Dorsey, et al.

It is certified that error appears in the above-identified patent and that said Letters Patent is hereby corrected as shown below:

Abstract, line 13--change "ad" to --and--.

Signed and Sealed this

Tenth Day of November, 1992

*Attest:*

DOUGLAS B. COMER

*Attesting Officer*   Acting Commissioner of Patents and Trademarks